United States Patent
Ting et al.

(10) Patent No.: US 8,707,071 B2
(45) Date of Patent: Apr. 22, 2014

(54) POWER MANAGEMENT METHOD FOR CONTROLLING COMMUNICATION INTERFACE TO ENTER/LEAVE POWER-SAVING MODE AND RELATED DEVICE THEREOF

(75) Inventors: Chien-Yu Ting, Kaohsiung (TW); Tso-Lin Wang, Hsinchu County (TW); Yu-Bang Nian, Changhua County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 380 days.

(21) Appl. No.: 13/080,687

(22) Filed: Apr. 6, 2011

(65) Prior Publication Data

US 2012/0089851 A1 Apr. 12, 2012

Related U.S. Application Data

(60) Provisional application No. 61/392,465, filed on Oct. 12, 2010.

(51) Int. Cl.
| | |
|---|---|
| *G06F 1/26* | (2006.01) |
| *G11C 11/00* | (2006.01) |
| *G11C 5/14* | (2006.01) |
| *H04B 1/38* | (2006.01) |
| *G06F 15/16* | (2006.01) |
| *G06F 13/00* | (2006.01) |
| *G06F 1/32* | (2006.01) |

(52) U.S. Cl.
CPC .................................... *G06F 1/32* (2013.01)
USPC ...... 713/320; 365/189.01; 365/227; 375/220; 709/209; 709/228; 711/100

(58) Field of Classification Search
CPC ........................................................ G06F 1/32
USPC ............ 713/320; 365/189.011, 227; 375/220; 709/209, 228; 711/100
See application file for complete search history.

(56) References Cited

U.S. PATENT DOCUMENTS

| | | | |
|---|---|---|---|
| 5,758,040 A | 5/1998 | Ichimura | |
| 6,480,476 B1 | 11/2002 | Willars | |
| 6,584,529 B1* | 6/2003 | Thomas | 710/240 |
| 7,216,185 B2* | 5/2007 | Kato | 710/52 |
| 7,475,265 B2 | 1/2009 | Oshikawa | |
| 7,584,312 B2 | 9/2009 | Kuroda | |
| 8,433,937 B1* | 4/2013 | Wheelock et al. | 713/320 |

(Continued)

FOREIGN PATENT DOCUMENTS

| | | |
|---|---|---|
| CN | 1637727 A | 7/2005 |
| CN | 1924761 A | 3/2007 |
| TW | 437200 | 5/2001 |

*Primary Examiner* — Stefan Stoynov
(74) *Attorney, Agent, or Firm* — Winston Hsu; Scott Margo

(57) ABSTRACT

One power management method of a communication interface includes: when receiving a command transmitted via the communication interface, checking if a predetermined criterion is met; and when the predetermined criterion is met, controlling the communication interface to enter a power-saving mode before an end of the received command. Another power management method of a communication interface includes: when the communication interface is operated under a power-saving mode, checking if a predetermined criterion of an executed command is met; and when the predetermined criterion is met, controlling the communication interface to leave the power-saving mode.

6 Claims, 11 Drawing Sheets

(56) References Cited

U.S. PATENT DOCUMENTS

| | | | |
|---|---|---|---|
| 2003/0145133 A1* | 7/2003 | Pelly et al. | 710/1 |
| 2005/0144490 A1* | 6/2005 | Igari | 713/300 |
| 2006/0069932 A1* | 3/2006 | Oshikawa et al. | 713/300 |
| 2006/0075185 A1* | 4/2006 | Azzarito et al. | 711/113 |
| 2006/0129703 A1* | 6/2006 | Oshikawa et al. | 710/14 |
| 2012/0042182 A1* | 2/2012 | Fulkerson et al. | 713/320 |

* cited by examiner

POWER MANAGEMENT METHOD FOR CONTROLLING COMMUNICATION INTERFACE TO ENTER/LEAVE POWER-SAVING MODE AND RELATED DEVICE THEREOF

CROSS REFERENCE TO RELATED APPLICATIONS

This application claims the benefit of U.S. Provisional Application No. 61/392,465, filed on Oct. 12, 2010 and incorporated herein by reference.

BACKGROUND

The disclosed embodiments of the present invention relate to power management, and more particularly, to a power management method for controlling a communication interface to enter/leave a power-saving mode and related device thereof.

Generally, a host transmits data to and receives data from a device through a communication interface. To reduce the power consumption, a power management may be employed to manage the operation of the communication interface. One conventional power management design is to make the communication interface operated under a power-saving mode during a period starting from the end of a previous command issued from the host to the device and ending at the beginning of the current command issued from the host to the device. In other words, this conventional power management design only enables the power-saving sequence during a command gap between two successive commands generated from the host to the device. The length of the command gap between two successive commands depends on host's execution efficiency. However, regarding a low-speed device, performing the power-saving sequence during the command gap between two successive commands cannot save much power due to the fact that communication interface may spend much time on waiting for the end of the command processed by the low-speed device.

Besides, in accordance with the conventional power management design, the communication interface enters the power-saving mode when the previous command is finished and leaves the power-saving mode when the current command is sent from the host. As the communication interface needs some time to wake up from the power-saving mode, the device therefore is unable to receive and process the host command immediately. As a result, the data transmission efficiency may be degraded.

SUMMARY

In accordance with exemplary embodiments of the present invention, a power management method for controlling a communication interface to enter/leave a power-saving mode and related device thereof are proposed to solve the above-mentioned problem.

According to a first aspect of the present invention, an exemplary power management method of a communication interface is disclosed. The exemplary power management method includes: when receiving a command transmitted via the communication interface, checking if a predetermined criterion is met; and when the predetermined criterion is met, controlling the communication interface to enter a power-saving mode before an end of the received command.

According to a second aspect of the present invention, an exemplary power management method of a communication interface is disclosed. The exemplary power management method includes: when the communication interface is operated under a power-saving mode, checking if a predetermined criterion of an executed command is met; and when the predetermined criterion is met, controlling the communication interface to leave the power-saving mode.

According to a third aspect of the present invention, an exemplary device with power management capability for a communication interface is disclosed. The exemplary device includes a command receiving module and a judging module. The command receiving module is arranged for receiving a command transmitted via the communication interface. The judging module is arranged for checking if a predetermined criterion is met when the command is received by the command receiving module, wherein when the predetermined criterion is met, the judging module is further arranged for controlling the communication interface to enter a power-saving mode before an end of the received command.

According to a fourth aspect of the present invention, an exemplary device with power management capability for a communication interface is disclosed. The exemplary device includes a command execution module and a judging module. The command execution module is arranged for executing a command. The judging module is arranged for checking if a predetermined criterion of the executed command is met when the communication interface is operated under a power-saving mode, wherein when the predetermined criterion is met, the judging module is further arranged for controlling the communication interface to leave the power-saving mode.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
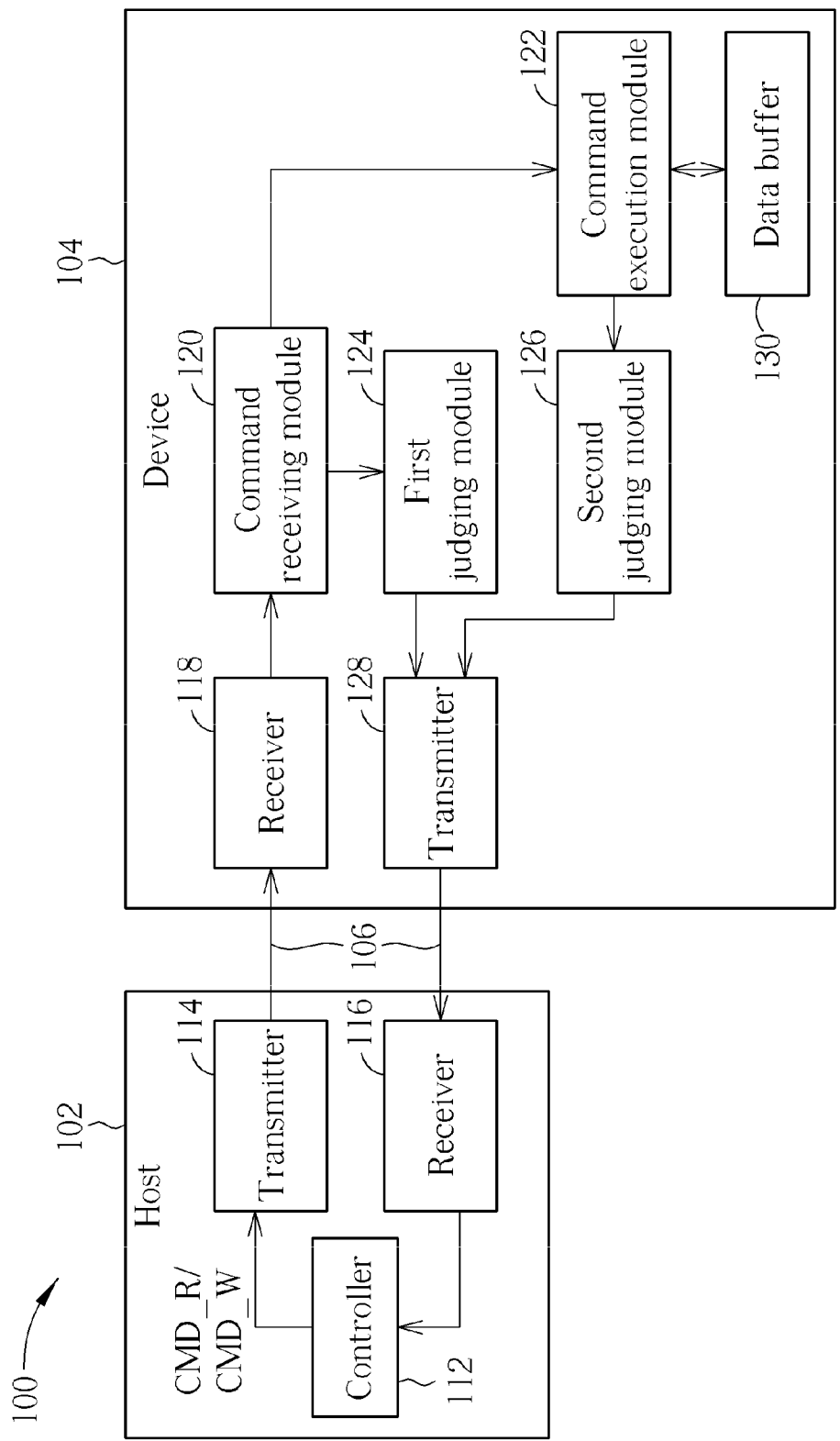
FIG. 1 is a diagram illustrating an electronic apparatus according to an exemplary embodiment of the present invention.

Please refer to FIG. 1, which is a diagram illustrating an electronic apparatus according to an exemplary embodiment of the present invention. The exemplary electronic apparatus 100 includes a host 102 and a device 104, wherein the host 102 communicates with the device 104 through a communication interface 106. By way of example, but not limitation, the communication interface 106 may be a serial interface, such as a universal serial bus (USB) or a serial advanced technology attachment (SATA) interface. However, this is for illustrative purposes only, and is not meant to be a limitation of the present invention. Specifically, any communication interface which employs the exemplary power management scheme proposed in the present invention to reduce its power consumption falls within the scope of the present invention.

The host 102 includes, but is not limited to, a controller 112, a transmitter 114, and a receiver 116. The device 104 includes, but is not limited to, a receiver 118, a command receiving module 120, a command execution module 122, a first judging module 124, a second judging module 126, a transmitter 128, and a data buffer 130. Please note that only the elements pertinent to technical features of the present invention are shown in FIG. 1. Besides, any of the command receiving module 120, the command execution module 122, the first judging module 124, and the second judging module 126 may be implemented by a pure hardware circuit or a hardware processor which executes a program code (e.g., firmware) for performing the intended functionality.

The controller 112 may issue a read command CMD_R to request desired data from the device 104 and/or issue a write command CMD_W to store desired data into the device 104. As shown in FIG. 1, the transmitter 114 disposed at the host side is coupled to the receiver 118 disposed at the device side via the communication interface 106. Therefore, the read command CMD_R/write command CMD_W generated from the controller 112 will be transmitted from the transmitter 114 of the host 102 and then received by the receiver 118 of the device 104. In addition to the read command CMD_R/write command CMD_W issued from the host 102, the transmitter 114 may output data designated by the write command CMD_W. Similarly, besides the read command CMD_R/write command CMD_W issued from the host 102, the receiver 118 may receive the designated data corresponding to the write command CMD_W. The command receiving module 120 is coupled to the receiver 118, and arranged for receiving commands that are transmitted via the communication interface 106 and received by the receiver 118. A received command (e.g., the read command CMD_R or the write command CMD_W) is transmitted to the command execution module 122 which is arranged for executing/processing the received command.

In a case where the received command is the read command CMD_R, the command execution module 122 executes the read command CMD_R to prepare all of the requested data in the data buffer 130. As shown in FIG. 1, the transmitter 128 disposed at the device side is coupled to the receiver 116 disposed at the host side via the communication interface 106. When all of the requested data are available in the data buffer 130, the command execution module 122 may finish the execution/processing of the read command CMD_R by outputting the requested data to the host 102 through the transmitter 128. Therefore, the controller 112 obtains the requested data through the receiver 116.

In another case where the received command is the write command CMD_W, the command execution module 122 executes/processes the write command CMD_W to store data designated by the write command CMD_W into free storage space of the data buffer 130. Therefore, the designated data corresponding to the write command CMD_W will be transmitted from the transmitter 114 to the receiver 118 via the communication interface 106.

In this exemplary embodiment, the first judgment module 124 is arranged to determine the timing of switching the communication interface 106 from a normal mode (i.e., a state with full power consumption) to a power-saving mode (i.e., a state with reduced power consumption). For example, the first judging module 124 checks if a first predetermined criterion is met when a command (e.g., the read command CMD_R or the write command CMD_W) is received by the command receiving module 120, wherein when the first predetermined criterion is met, the first judging module 124 controls the communication interface 106 to enter the power-saving mode before an end of the received command executed by the command execution module 122. For example, when the first predetermined criterion is met, the first judging module 124 decides that the communication interface 106 should enter the power-saving mode, and asks the host 102 to do the power-saving control sequence upon the communication interface 106, thereby controlling the communication interface 106 to enter the power-saving mode. However, this is for illustrative purposes only. Any control scheme capable of making the communication interface 106 switched from the normal mode to the power-saving mode may be employed by the exemplary embodiment of the present invention.

To put it simply, the first judging module 124 is arranged to selectively enable the power-saving mode of the communication interface 106 during command processing, which is different from the conventional power management design that enables the power-saving mode of the communication interface during a command gap between two successive commands.

By way of example, the first judging module 124 achieves the objective of checking if the first predetermined criterion is met by checking if the received command is allowed to be processed immediately. Please refer to FIG. 2, which is a flowchart illustrating a power management method of a communication interface according to a first exemplary embodiment of the present invention. Provided that the result is substantially the same, the steps are not required to be executed in the exact order shown in FIG. 2. Besides, additional step(s) may be inserted between two steps shown in FIG. 2. The exemplary power management method may be employed by the device 104 shown in FIG. 1 to manage the operational mode of the communication interface 106, and may be briefly summarized as follows.

Step 200: Start.

Step 202: Receive a command transmitted via a communication interface operated under a normal mode.

Step 204: Check if the received command is allowed to be processed immediately. If yes, go to step 208; otherwise, go to step 206.

Step 206: Control the communication interface to enter a power-saving mode.

Step 208: Execute/process the received command.

Step 210: End.

After the command receiving module 120 receives a command (e.g., the read command CMD_R or the write command CMD_W) through the receiver 118 which is coupled to the communication interface 106 (step 202), the first judging module 124 checks if the first predetermined criterion is met. In this exemplary embodiment, the first predetermined criterion is examined by checking if the received command is allowed to be processed immediately (step 204). When the received command is not allowed to be processed immediately, the first judging module 124 determines that the first predetermined criterion is met; otherwise, the first predetermined criterion is not met. Therefore, when the first predetermined criterion is met (i.e., the received command is not allowed to be processed immediately), the first judging module 124 decides that the power-saving mode of the communication interface 106 should be enabled, and initiates a power management scheme to control the communication interface 106 to switch from the normal mode into the power-saving mode. The command execution module 122 processes the received command under the condition where the communication interface 106 is operated in the power-saving mode (step 208). That is, the communication interface 106 would stay in the power-saving mode for power consumption reduction during command processing. The communication interface 106 may leave the power-saving mode or enter the normal mode again. It should be noted that, no matter when the communication interface 106 leaves the power-saving mode, the spirit of the present invention is obeyed as long as the power management method shown in FIG. 1 is employed for selectively controlling the communication interface 106 to enter the power-saving mode upon reception of a command transmitted via the communication interface 106 operated under the normal mode.

In one exemplary design, the first judging module 124 checks a buffer status of the data buffer 130 to determine if the received command is allowed to be processed immediately. Please refer to FIG. 3, which is a diagram illustrating a first exemplary implementation of step 204 shown in FIG. 2. When the received command is the read command CMD_R issued from the controller 112 at the host side, step 204 may be implemented by step 304 which is performed to achieve the objective of checking the buffer status of the data buffer to determine if the received command is allowed to be processed immediately by checking if data requested by the read command CMD_R are already available in the data buffer 130.

For example, when it is found that part or all of the data requested by the read command CMD_R are not available in the data buffer 130 (e.g., the data buffer 130 contains no data requested by the read command CMD_R, or the data requested by the read command CMD_R are currently being stored into the data buffer 130), this implies that the device 104 still needs some time to accomplish preparation of all data requested by the read command CMD_R. Thus, the first judging module 124 determines that the received read command CMD_R is not allowed to be processed immediately (i.e., the first predetermined criterion is met), and the communication interface 106 is allowed to enter the power-saving mode for power consumption reduction. When it is found that all of the data requested by the read command CMD_R are already available in the data buffer 130, this implies that the device 104 does not need any additional time to prepare data requested by the read command CMD_R. Thus, the first judging module 124 determines that the received read command CMD_R is allowed to be processed immediately (i.e., the first predetermined criterion is not met). Therefore, upon reception of the read command CMD_R, the command execution module 122 processes the received read command CMD_R for transmitting the requested data to the controller 112 which issues the read command CMD_R without entering power saving mode.

Figure 2:
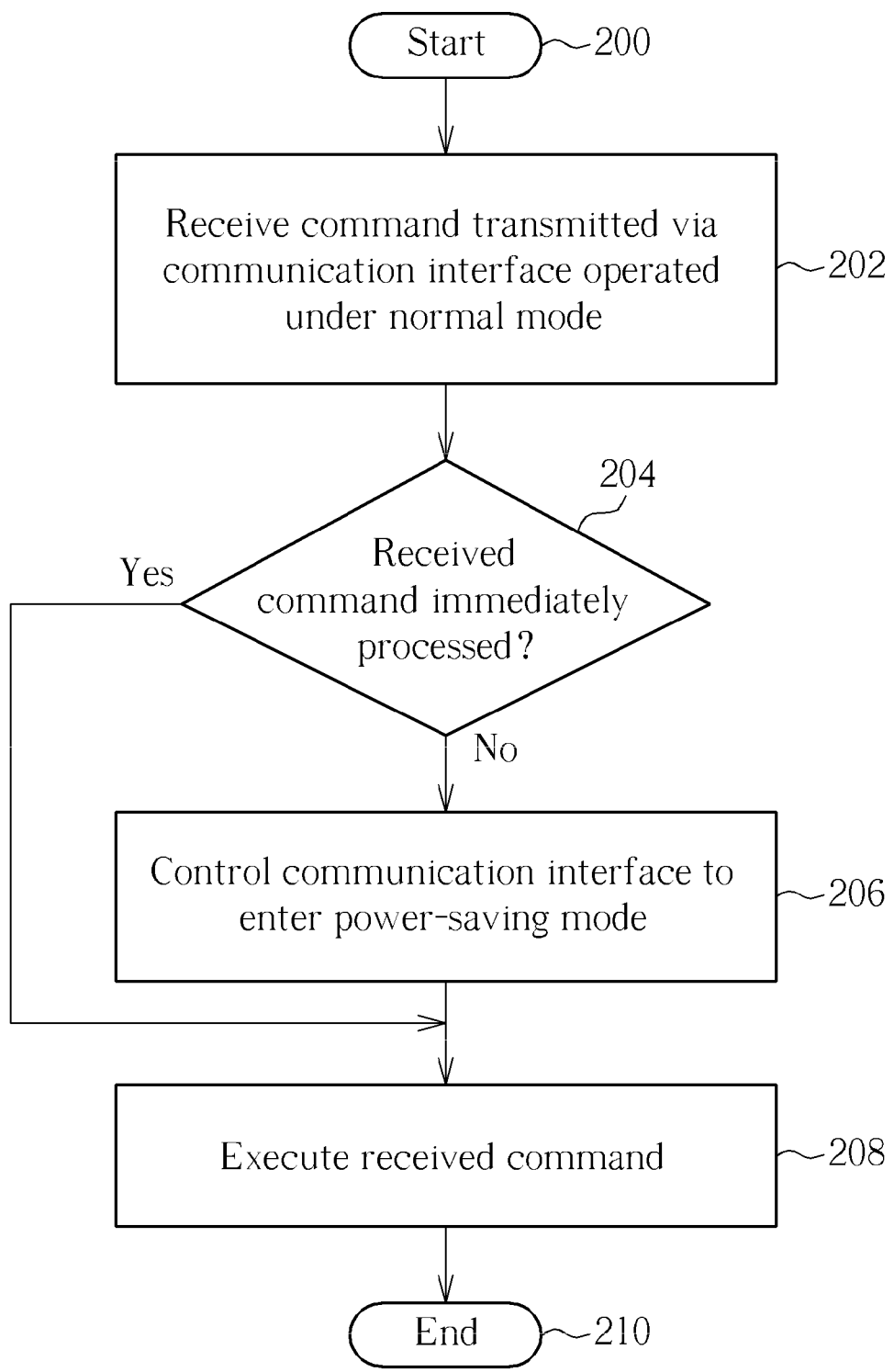
FIG. 2 is a flowchart illustrating a power management method of a communication interface according to a first exemplary embodiment of the present invention.
Figure 3:
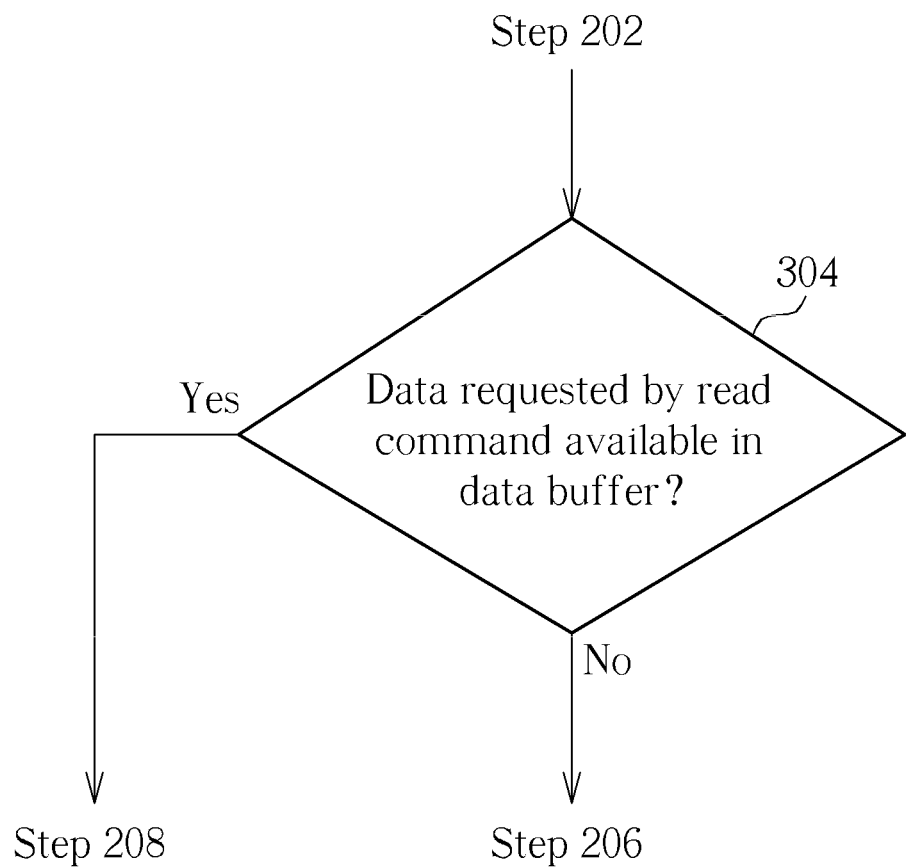
FIG. 3 is a diagram illustrating a first exemplary implementation of step 204 shown in FIG. 2.
Figure 4:
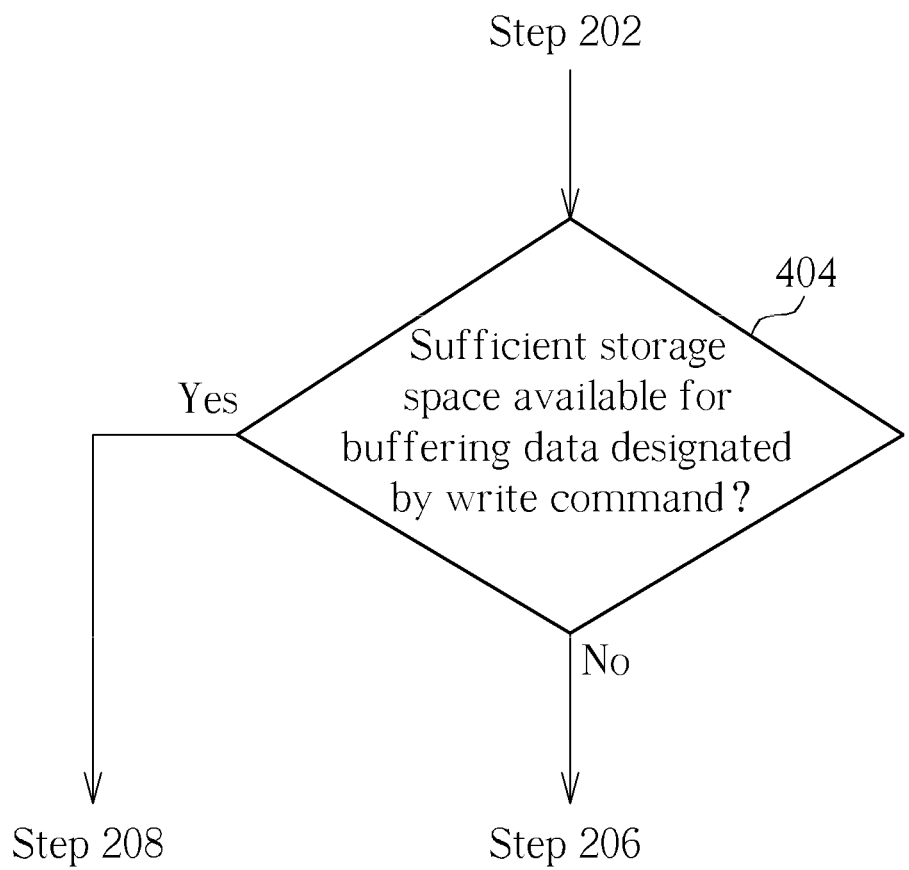
FIG. 4 is a diagram illustrating a second exemplary implementation of step 204 shown in FIG. 2.

Please refer to FIG. 4, which is a diagram illustrating a second exemplary implementation of step 204 shown in FIG. 2. When the received command is the write command CMD_W issued from the controller 112 at the host side, step 204 may be implemented by step 404 which is performed to achieve the objective of checking the buffer status of the data buffer to determine if the received command is allowed to be processed immediately by checking if the data buffer 130 has sufficient storage space available for buffering data designated by the write command CMD_W. Therefore, when it is found that the data buffer 130 does not have enough storage space available for buffering the data designated by the write command CMD_W (e.g., the data buffer 130 still has a great amount of buffered data waiting to be processed), this implies that the data buffer 130 is not ready to store the data designated by the write command CMD_W yet. Thus, the first judging module 124 determines that the received write command CMD_W is not allowed to be processed immediately (i.e., the first predetermined criterion is met), and the communication interface 106 is allowed to enter the power-saving mode for power consumption reduction. When it is found that the data buffer 130 does have sufficient free storage space available for buffering the data designated by the write command CMD_W, this implies that the device 104 does not need to wait for release of any occupied storage space in the data buffer 130. Thus, the first judging module 124 determines that the received write command CMD_W is allowed to be processed immediately (i.e., the first predetermined criterion is not met). Upon reception of the write command CMD_W issued from the controller 112 of the host 102, the command execution module 122 processes the write command CMD_W for storing the data designated by the write command CMD_W into the data buffer 130.

Regarding the second judging module 126 shown in FIG. 1, it is arranged to determine the timing of switching the communication interface 106 from a power-saving mode (e.g., a state with reduced power consumption) to a normal mode (e.g., a state with full power consumption). For example, the second judging module 126 checks if a second predetermined criterion of an executed command (e.g., the read command CMD_R or the write command CMD_W executed by the command execution module 122) is met when the communication interface 106 is operated under the power-saving mode. When the second predetermined criterion is met, the second judging module 126 controls the communication interface 106 to leave the power-saving mode; otherwise, the communication interface 106 keeps staying in the power-saving mode. To put it another way, the second judging module 126 is arranged to selectively disable the power-saving mode of the communication interface 106 during command processing, which is different from the conventional power management design that disables the power-saving mode of the communication interface during a command gap between two successive commands.

For example, the second judging module 128 checks if the second predetermined criterion of the executed command is met by checking a buffer status of the data buffer 130. In one implementation, the second judging module 128 may know the buffer status of the data buffer 130 by performing a polling operation upon the command execution module 122 which is responsible for processing the read command/write command associated data access of the data buffer 130. In another implementation, the command execution module 122 may be configured to actively inform the second judging module 128 of information associated with the buffer status of the data buffer 130. For example, when the preparation of the data requested by the read command CMD_R is done, the command execution module 122 actively notifies the second judging module 126 that the data buffering operation performed in response to the executed/processed read command CME_R already makes the data buffer 130 have all requested data available therein. Besides, when releasing the occupied storage space in the data buffer 130 is done during the processing of the write command CMD_W, the command execution module 122 actively notifies the second judging module 126 that the data buffer 130 has sufficient free storage space for buffering all of the data designated by the write command CMD_W. However, the above is for illustrative purposes only, and is not meant to be a limitation of the present invention. Any means capable of identifying the buffer status of the data buffer 130 can be employed in the exemplary embodiment of the present invention.

Figure 5:
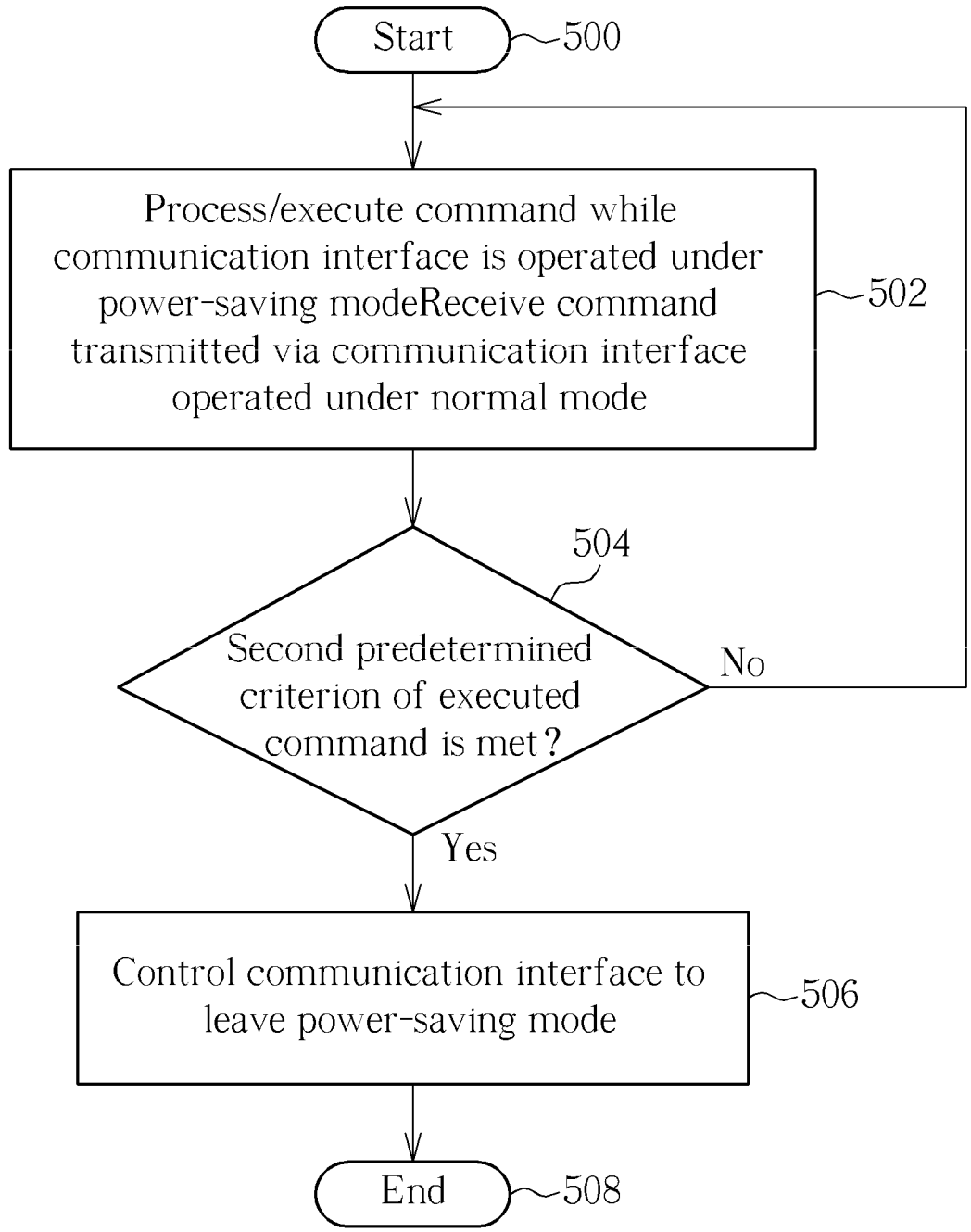
FIG. 5 is a flowchart illustrating a power management method of a communication interface according to a second exemplary embodiment of the present invention.

Please refer to FIG. 5, which is a flowchart illustrating a power management method of a communication interface according to a second exemplary embodiment of the present invention. Provided that the result is substantially the same, the steps are not required to be executed in the exact order shown in FIG. 5. Besides, additional step(s) may be inserted between two steps shown in FIG. 5. The exemplary power management method may be employed by the device 104 shown in FIG. 1 for managing the operational mode of the communication interface 106, and may be briefly summarized as follows.

Step 500: Start.

Step 502: Process/execute a command while a communication interface is operated under a power-saving mode.

Step 504: Check if a second predetermined criterion of the executed command is met by checking a buffer status of a data buffer. If yes, go to step 506; otherwise, go to step 502.

Step 506: Control the communication interface to leave the power-saving mode.

Step 508: End.

In this exemplary embodiment, the command execution module 122 processes/executes a command when the communication interface 106 is operated under the power-saving mode (step 502). Therefore, when the communication interface 106 is operated under the power-saving mode, the second judging module 126 checks the buffer status of the data buffer 130 to see if the second predetermined criterion of the executed command is met (step 504). When the checking result indicates that the second predetermined criterion is met, the second judging module 126 decides that the power-saving mode of the communication interface 106 should be disabled, and therefore controls the communication interface 106 to switch from the power-saving mode to the normal mode (step 506). Otherwise, the command execution module 122 keeps processing the command under a condition where the communication interface 106 is operated in the power-saving mode. That is, the communication interface 106 does not leave the power-saving mode until the second predetermined criterion of the executed command is met. By way of example, the communication interface 106 may enter the power-saving mode according to the flowchart shown in FIG. 2. That is, the command executed in step 502 is the command received in step 202. However, this is for illustrative purposes only. The spirit of the present invention is obeyed as long as the power management method shown in FIG. 5 is employed for selectively controlling the communication interface 106 to leave the power-saving mode during command processing.

Figure 6:
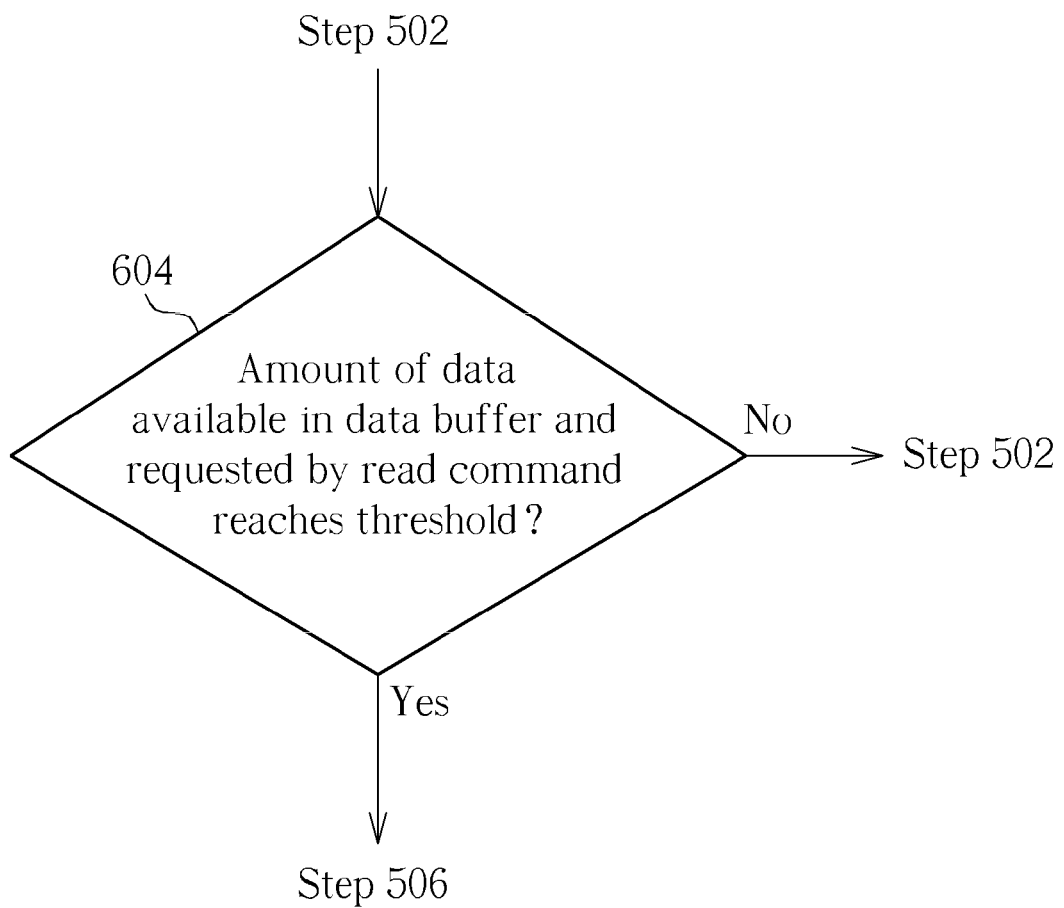
FIG. 6 is a diagram illustrating a first exemplary implementation of step 504 shown in FIG. 5.

In one exemplary scenario, the executed command in step 502 is the read command CMD_R received via the communication interface 106, and the second judging module 126 achieves the objective of checking the buffer status of the data buffer 130 to determine if the second predetermined criterion is met by checking if an amount of data available in the data buffer 130 and requested by the read command CMD_R reaches a threshold. Please refer to FIG. 6, which is a diagram illustrating a first exemplary implementation of step 504 shown in FIG. 5. When the executed command in step 502 is the read command CMD_R received via the communication interface 106, step 504 may be implemented by step 604. Therefore, when it is found that the amount of data available in the data buffer 130 and requested by the read command CMD_R reaches the threshold, the second judging module 126 determines that the second predetermined criterion is met, and the communication interface 106 is allowed to leave the power-saving mode.

In a first exemplary design, the threshold in step 604 is set to a value equal to an amount of all data requested by the read command CMD_R issued from the controller 112 at the host side. Therefore, when all of the data requested by the read command CMD_R are already available in the data buffer 130, this implies that the device 104 is ready for transmitting the requested data to the controller 112 which issues the read command CMD_R. Thus, the second judging module 126 controls the communication interface 106 to switch from the power-saving mode to the normal mode, and the command execution module 122 may finish the read command CMD_R by transmitting all of the requested data to the controller 112 of the host 102.

As mentioned above, the step of controlling the communication interface 106 to leave the power-saving mode is performed after all of the data requested by the read command CMD_R are already available in the data buffer 130. However, accomplishing the procedure of waking up the communication interface 106 from the power-saving mode to the normal mode would require a period of processing time. That is, there is an interval between a time point at which the communication interface 106 starts leaving the power-saving mode and a time point at which the communication interface 106 successfully enters the normal mode. When the second judging module 126 determines that the second predetermined criterion is met and controls the communication interface 106 to leave the power-saving mode, the device 104 does not start transmitting the requested data to the host 102 immediately due to the fact that the communication interface 106 does not enter the normal mode yet. As to the device 104 that transmits the requested data in response to the read command CMD_R issued from the host 102, additional steps may be performed by the device 104 after the procedure of waking up the communication inter 106 is initiated by the second judging module 126.

Figure 7:
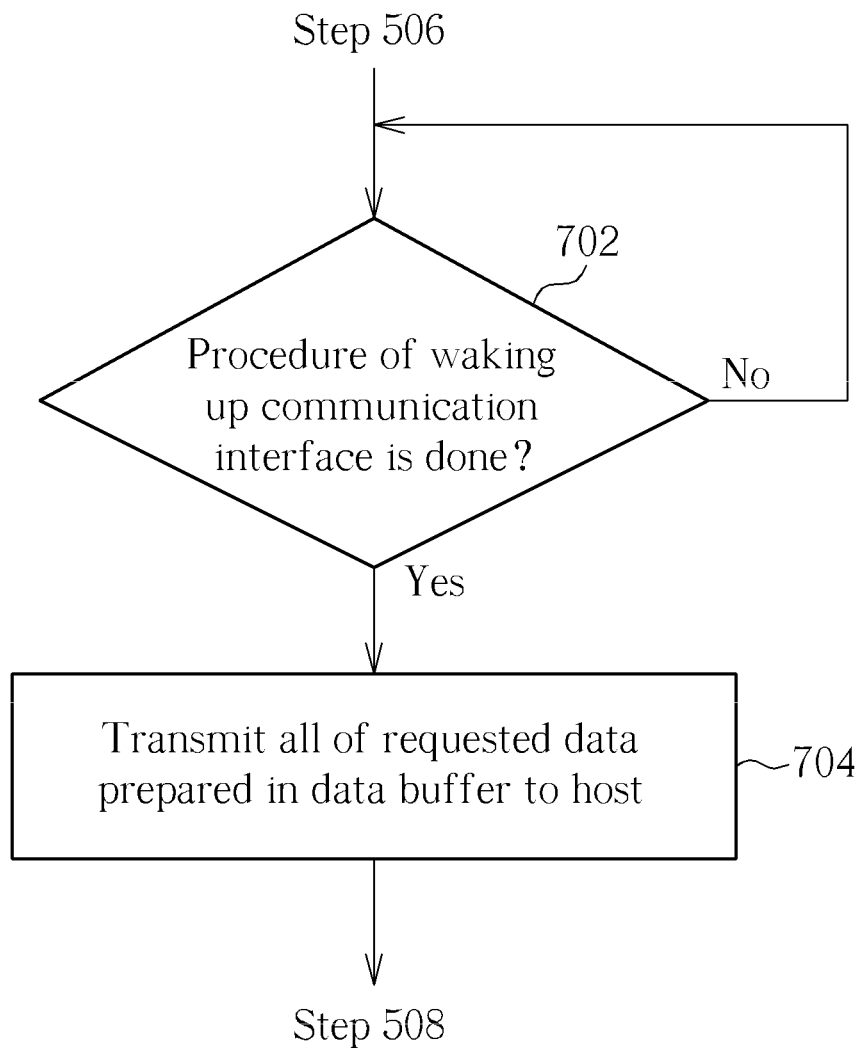
FIG. 7 is a diagram illustrating additional steps inserted between steps 506 and 508 shown in FIG. 5 according to a first exemplary embodiment of the present invention.

Please refer to FIG. 7, which is a diagram illustrating additional steps inserted between steps 506 and 508 shown in FIG. 5 according to a first exemplary embodiment of the present invention. In step 702, the command execution module 122 checks if the procedure of waking up the communication interface 106 is done (i.e., checks if the communication interface 106 already enters the normal mode). When the procedure of waking up the communication interface 106 is not accomplished yet, the command execution module 122 keeps waiting for the end of the procedure. When the procedure of waking up the communication interface 106 is successfully accomplished, implying that the communication interface 106 stays in the normal mode now, the command execution module 122 may finish the read command CMD_R by transmitting all of the requested data in the data buffer 130 to the controller 112 (step 704).

In a second exemplary design, the threshold in step 604 is set to a value less than an amount of all data requested by the read command CMD_R issued from the controller 112 at the host side. Therefore, as the procedure of waking up the communication interface 106 from the power-saving mode to the normal mode requires a period of processing time, the second judging module 126 may be particularly configured to wake up the communication interface 106 in advance. In this way, when all of the requested data are prepared in the data buffer 130 during command processing, the command execution module 122 may be allowed to start transmitting the requested data to the host 102 immediately, thereby improving the data transfer efficiency greatly. As the processing time required for accomplishing the procedure of waking up the communication interface 106 may be known in advance, the threshold in step 604 can be properly set to thereby control the timing that the second judging module 126 should wake up the communication interface 106. Thus, as to the device 104 that transmits the requested data in response to the read command CMD_R issued from the host 102, additional steps may be performed by the device 104 after the procedure of waking up the communication interface 106 is initiated by the second judging module 126.

Figure 8:
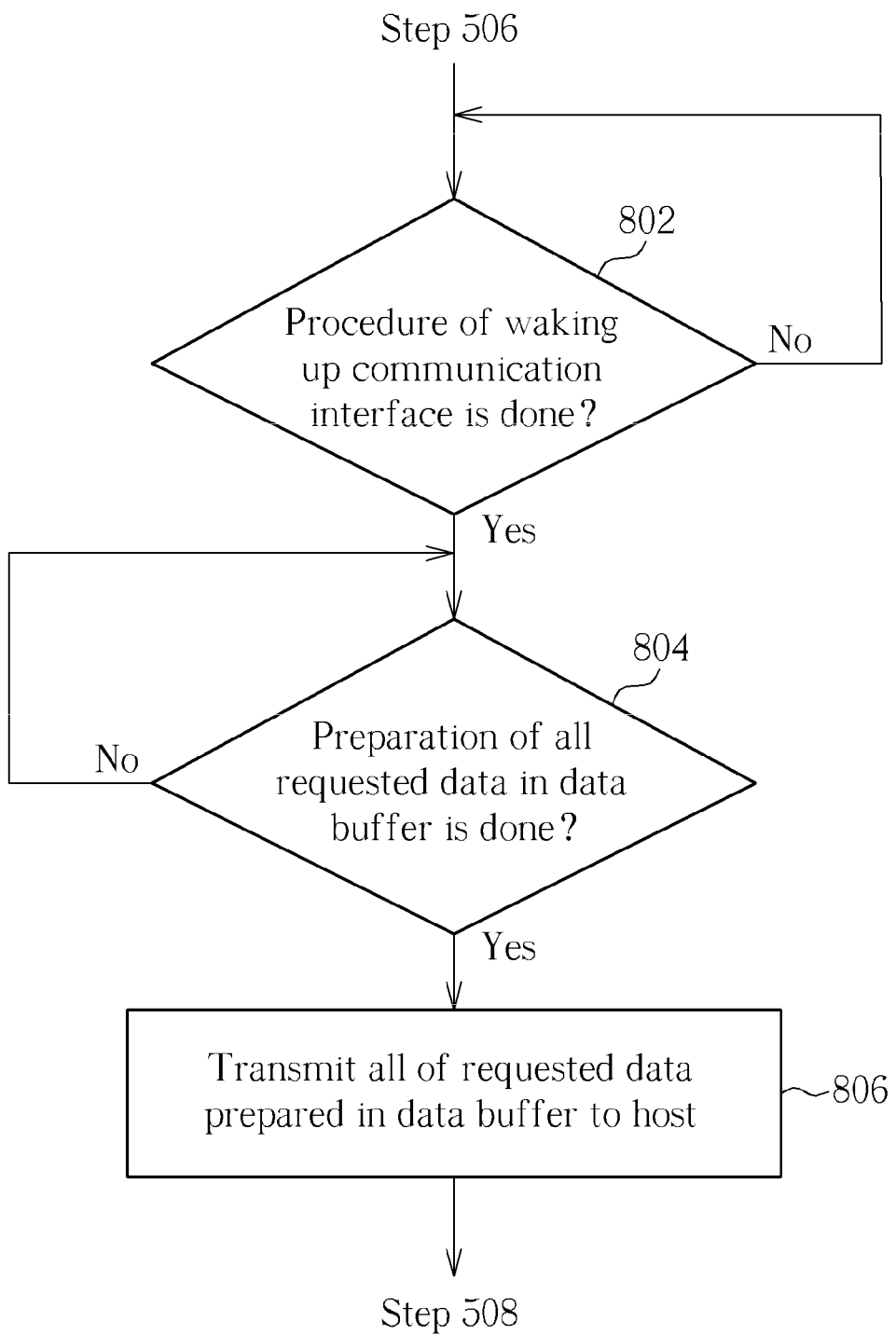
FIG. 8 is a diagram illustrating additional steps inserted between steps 506 and 508 shown in FIG. 5 according to a second exemplary embodiment of the present invention.

Please refer to FIG. 8, which is a diagram illustrating additional steps inserted between steps 506 and 508 shown in FIG. 5 according to a second exemplary embodiment of the present invention. In step 802, the command execution module 122 checks if the procedure of waking up the communication interface 106 in advance is done (i.e., checks if the communication interface 106 already enters the normal mode). When the procedure of waking up the communication interface 106 in advance is not accomplished yet, the command execution module 122 keeps waiting for the end of the procedure. When the procedure of waking up the communication interface 106 in advance is accomplished, the communication interface 106 stays in the normal mode. However, as the communication interface 106 is woken up in advance, it is possible that all of the data requested by the read command CMD_R may not be available in the data buffer 130 yet. Therefore, the command execution module 122 may still process the read command CMD_R to accomplish the preparation of the requested data in the data buffer 130 (step 804). When all of the data requested by the read command CMD_R are already available in the data buffer 130, implying that the device 104 is ready for transmitting the requested data to the controller 112 which issues the read command CMD_R, the command execution module 122 may finish the read command CMD_R by transmitting the requested data to the controller 112 (step 806).

As mentioned above, the processing time required for accomplishing the procedure of waking up the communication interface 106 may be known in advance. In addition, the input data rate associated with preparation of the requested data (i.e., buffering of the requested data) in the data buffer 130 may also be known. Therefore, with a proper setting of the threshold in step 604, it is also possible that the time point at which the communication interface 106 successfully enters the normal mode is identical to a time point at which the command execution module 122 finishes the preparation of all data requested by the read command CMD_R. Thus, in an alternative design having a properly defined threshold in step 604, the step 804 shown in FIG. 8 is optional and may be omitted.

Figure 9:
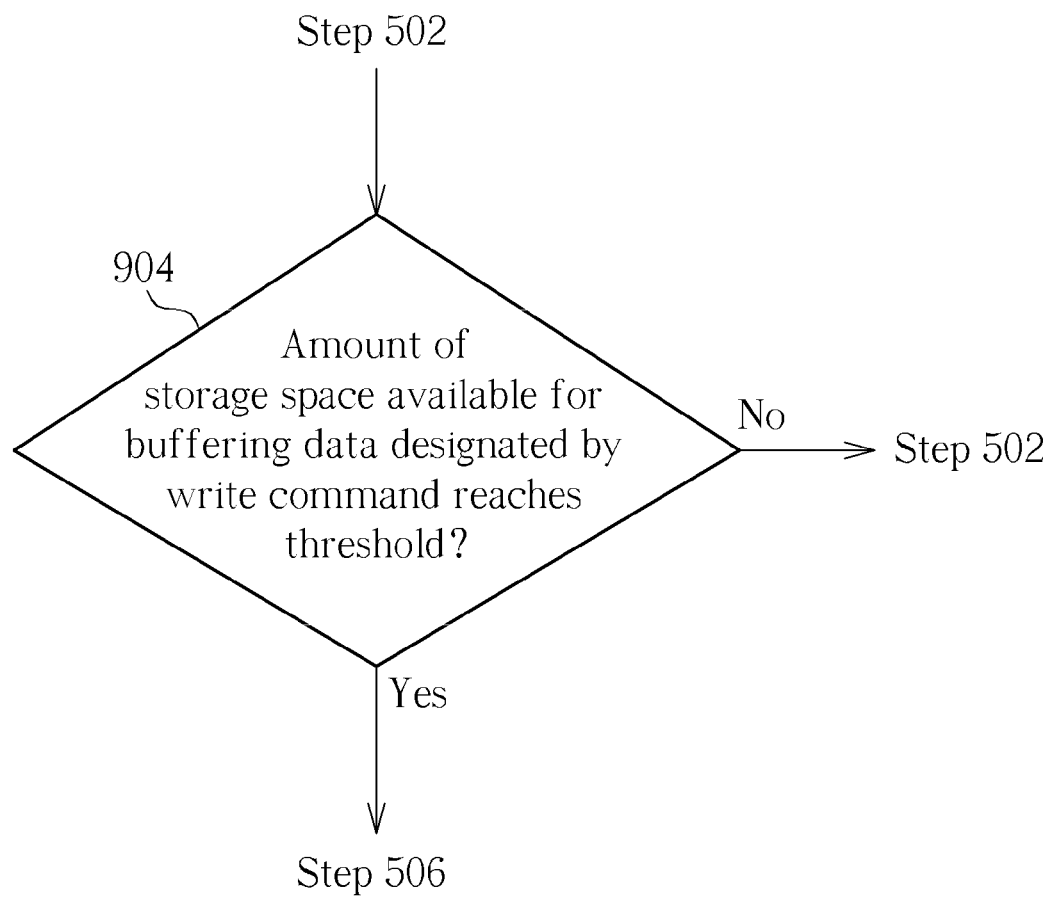
FIG. 9 is a diagram illustrating a second exemplary implementation of step 504 shown in FIG. 5.

In another exemplary scenario, the executed command in step 502 is the write command CMD_W received via the communication interface 106, and the second judging module 126 achieves the objective of checking the buffer status of the data buffer 130 to determine if the second predetermined criterion is met by checking if an amount of storage space available in the data buffer 130 for buffering data designated by the write command CMD_W reaches a threshold. Please refer to FIG. 9, which is a diagram illustrating a second exemplary implementation of step 504 shown in FIG. 5. When the executed command in step 502 is the write command CMD_W received via the communication interface 106, step 504 may be implemented by step 904. Therefore, when the amount of storage space data available in the data buffer 130 for buffering the data designated by the write command CMD_W reaches the threshold, the second judging module 126 determines that the second predetermined criterion is met, and the communication interface 106 is allowed to leave the power-saving mode.

In a first exemplary design, the threshold in step 904 is set to a value equal to an amount of all data designated by the write command CMD_W issued from the controller 112 at the host side. Therefore, when the data buffer 130 has sufficient free storage space for buffering all of the data designated by the write command CMD_W, implying that the device 104 is ready for receiving the designated data from the controller 112 which issues the write command CMD_W, the second judging module 126 controls the communication interface 106 to switch from the power-saving mode to the normal mode for receiving the designated data from the controller 112 of the host 102.

The step of controlling the communication interface 106 to leave the power-saving mode is performed after the data buffer 130 has sufficient free storage space for buffering all of the data designated by the write command CMD_W. However, as mentioned above, accomplishing the procedure of waking up the communication interface 106 from the power-saving mode to the normal mode would need a period of processing time. That is, there is an interval between a time point at which the communication interface 106 starts leaving the power-saving mode and a time point at which the communication interface 106 successfully enters the normal mode. When the second judging module 126 determines that the second predetermined criterion is met and controls the communication interface 106 to leave the power-saving mode, the device 104 does not start receiving the designated data from the host 102 immediately due to the fact that the communication interface 106 does not enter the normal mode yet. Thus, regarding the device 104 that receives the designated data in response to the write command CMD_W issued from the host 102, additional steps may be performed by the device 104 after the procedure of waking up the communication inter 106 is initiated by the second judging module 126.

Figure 10:
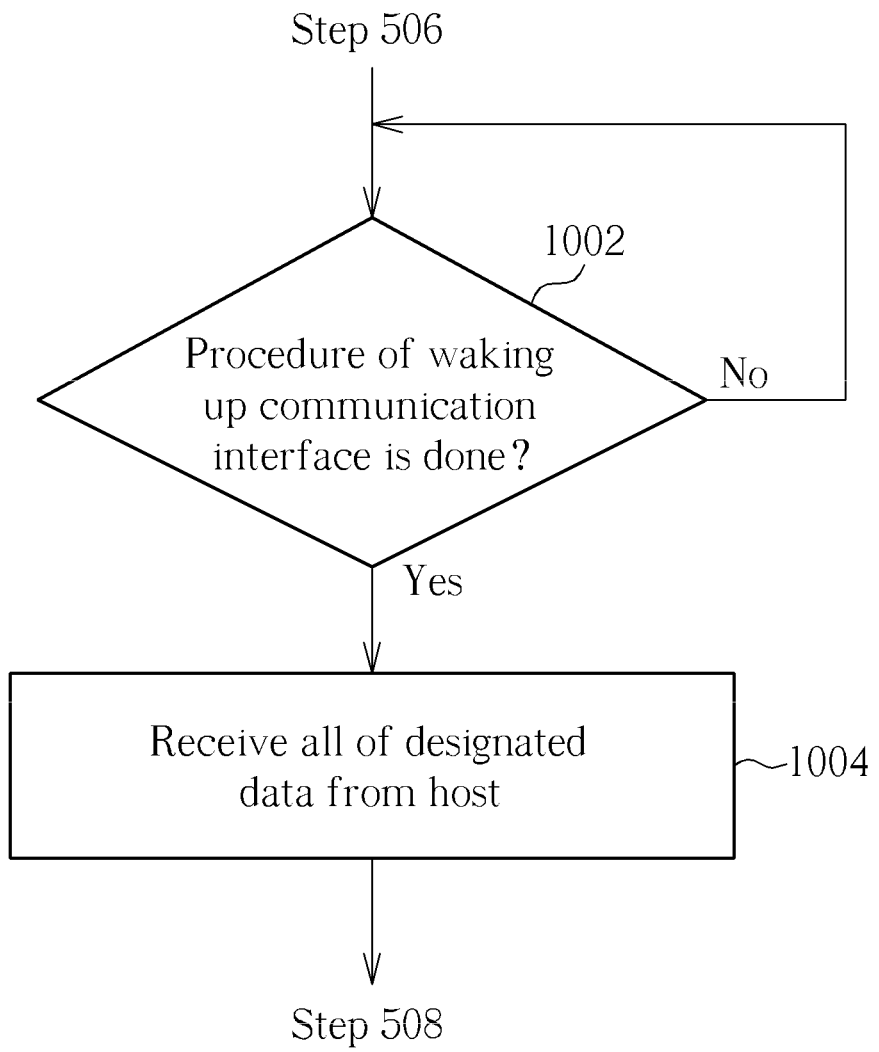
FIG. 10 is a diagram illustrating additional steps inserted between steps 506 and 508 shown in FIG. 5 according to a third exemplary embodiment of the present invention.

Please refer to FIG. 10, which is a diagram illustrating additional steps inserted between steps 506 and 508 shown in FIG. 5 according to a third exemplary embodiment of the present invention. In step 1002, the command execution module 122 checks if the procedure of waking up the communication interface 106 is done (i.e., checks if the communication interface 106 already enters the normal mode). When the procedure of waking up the communication interface 106 is not accomplished yet, the command execution module 122 keeps waiting for the end of the procedure. When the procedure of waking up the communication interface 106 is accomplished, this implies that the communication interface 106 stays in the normal mode now. The command execution module 122 therefore executes the write command CMD_W for receiving designated data corresponding to the write command CMD_W from the host 102 and buffering the received data into the data buffer 130 (step 1004).

In a second exemplary design, the threshold in step 604 is set to a value less than an amount of all data designated by the write command CMD_W issued from the controller 112 at the host side. Therefore, as the procedure of waking up the communication interface 106 from the power-saving mode to the normal mode requires a period of processing time, the second judging module 126 may be particularly configured to wake up the communication interface 106 in advance. In this way, when the data processing of the buffered data in the data buffer 130 releases the occupied storage space to thereby make the data buffer 130 have enough free storage space for buffering all of the designated data corresponding to the write command CMD_W, the device 104 may be allowed to start receiving the designated data from the host 102 immediately, thereby improving the data transfer efficiency greatly. As the processing time required for accomplishing the procedure of waking up the communication interface 106 may be known in advance, the threshold in step 904 can be properly set to thereby control the timing that the second judging module 126 should wake up the communication interface 106 in advance. As to the device 104 that receives the designated data in response to the write command CMD_W issued from the host 102, additional steps may be performed by the device 104 after the procedure of waking up the communication interface 106 is initiated by the second judging module 126.

Figure 11:
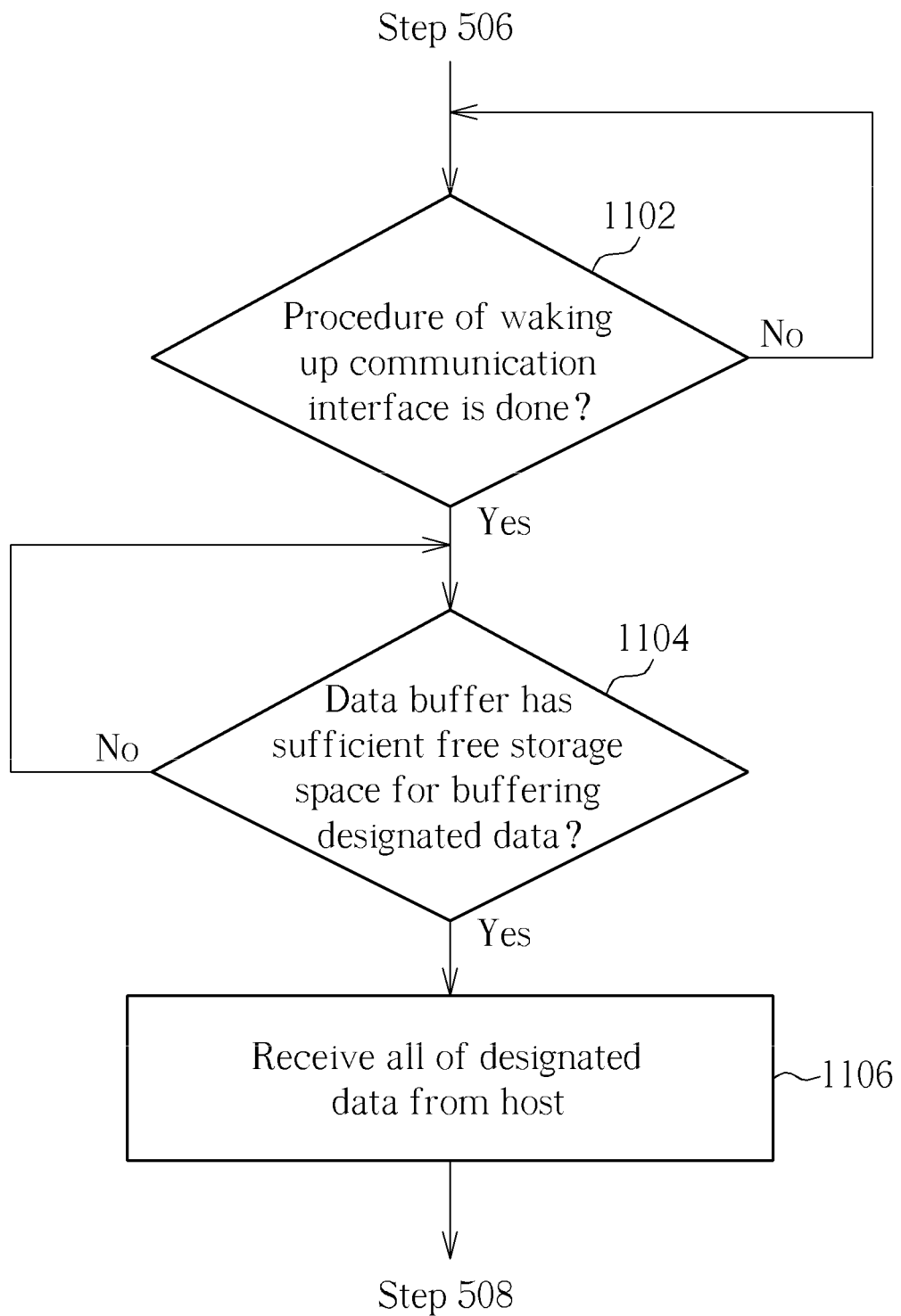
FIG. 11 is a diagram illustrating additional steps inserted between steps 506 and 508 shown in FIG. 5 according to a fourth exemplary embodiment of the present invention.

Please refer to FIG. 11, which is a diagram illustrating additional steps inserted between steps 506 and 508 shown in FIG. 5 according to a fourth exemplary embodiment of the present invention. In step 1102, the command execution module 122 checks if the procedure of waking up the communication interface 106 in advance is done (i.e., checks if the communication interface 106 already enters the normal mode). When the procedure of waking up the communication interface 106 in advance is not accomplished yet, the command execution module 122 keeps waiting for the end of the procedure. When the procedure of waking up the communication interface 106 in advance is accomplished, this implies that the communication interface 106 stays in the normal mode now. However, as the communication interface 106 is woken up in advance, the data buffer 130 may not have sufficient free storage space for buffering designated data of the write command CMD_W yet. Therefore, the command execution module 122 may still wait for the release of occupied storage space in the data buffer 130 (step 1104). When the data buffer 130 has sufficient free storage space for buffering all of the data designated by the write command CMD_W, implying that the device 104 is ready for receiving the designated data from the controller 112 which issues the write command CMD_W, the command execution module 122 therefore executes the write command CMD_W by receiving the designated data from the controller 112 and buffering the received data into the data buffer 130 (step 1106).

As mentioned above, the processing time required for accomplishing the procedure of waking up the communication interface 106 may be known in advance. In addition, the output data rate associated with processing of the buffered data (i.e., releasing of the occupied storage space) in the data buffer 130 may also be known. Therefore, with a proper setting of the threshold in step 904, it is possible that the time point at which the communication interface 106 successfully enters the normal mode is identical to a time point at which the data buffer has enough free storage space for buffering all data designated by the write command CMD_W. Thus, in an alternative design having a properly defined threshold in step 904, the step 1104 shown in FIG. 11 is optional and may be omitted.

In aforementioned embodiments, the actions executed after the second judging module 126 controls the communication interface 106 to leave the power-saving mode are for illustrative purposes only, and are not meant to be limitations of the present invention. In other words, the spirit of the present invention is obeys as long as the steps shown in FIG. 5 are employed to control whether the communication interface 106 should leave the power-saving mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power management method of a communication interface, comprising:
   when a received command transmitted via the communication interface is a write command and a data buffer has enough storage space available for buffering data designated by the write command, determining that a predetermined criterion is met; and
   when the predetermined criterion is met, controlling the communication interface to enter a power-saving mode before an end of the received command.

2. The power management method of claim 1, further comprising:
   when the received command is a read command and data requested by the read command are not available in the data buffer, determining that the predetermined criterion is met.

3. The power management method of claim 1, wherein the communication interface is a serial interface.

4. A device with power management capability for a communication interface, comprising:
   a command receiving module, arranged for receiving a command transmitted via the communication interface; and
   a judging module, arranged for determining that a predetermined criterion is met when the received command is a write command and a data buffer has enough storage space available for buffering data designated by the write command, wherein when the predetermined criterion is met, the judging module is further arranged for controlling the communication interface to enter a power-saving mode before an end of the received command.

5. The device of claim 4, wherein when the received command is a read command and data requested by the read command are not available in the data buffer, the judging module further determines that the predetermined criterion is met.

6. The device of claim 4, wherein the communication interface is a serial interface.

* * * * *